United States Patent [19]

Raudat et al.

[11] E Re. 30,508

[45] Reissued Feb. 10, 1981

[54] APPARATUS FOR STRAIGHTENING CELL-FORMING PARTITIONS IN A CARTON

[75] Inventors: John L. Raudat, North Madison, Conn.; Adam Z. Rydell, Decatur, Ga.

[73] Assignee: Standard-Knapp, Inc., Portland, Conn.

[21] Appl. No.: 56,642

[22] Filed: Jul. 11, 1979

Related U.S. Patent Documents

Reissue of:

[64] Patent No.: 4,034,656
Issued: Jul. 12, 1977
Appl. No.: 697,798
Filed: Jun. 18, 1976

[51] Int. Cl.[3] ..... B31D 3/04

[52] U.S. Cl. ..... 493/409; 53/263; 493/91

[58] Field of Search ..... 93/37 R, 37 SP, 37 EC, 93/36 R, 38; 53/263, 262, 248, 539

[56] References Cited

U.S. PATENT DOCUMENTS

| | | | |
|---|---|---|---|
| 1,374,454 | 4/1921 | Kucera | 93/37 R |
| 2,540,743 | 2/1951 | Leach | 53/262 X |
| 2,686,623 | 8/1954 | Wimmer et al. | 53/262 X |
| 2,701,085 | 2/1955 | Davis | 53/248 X |
| 3,555,770 | 1/1971 | Rowekamp | 53/248 X |
| 3,908,339 | 9/1975 | Kennedy et al. | 53/248 |
| 4,133,253 | 1/1979 | Butt | 93/37 R |
| 4,151,788 | 5/1979 | Wiseman | 93/37 R |

*Primary Examiner*—James F. Coan
*Attorney, Agent, or Firm*—McCormick, Paulding & Huber

[57] ABSTRACT

An apparatus for straightening cell-forming partitions within a carton or the like is provided by a mandrel in a partition straightening station having cones disposed thereon which project towards the open top of the carton. The mandrel is moved towards the carton and the cones enter the carton; at least one of the cones is longer than the other cones and is adapted to enter an inner cell formed by the partition; the shorter cones then enter the outermost cells formed by the partition. The partitions are thus aligned to receive products in the cells formed thereby.

10 Claims, 6 Drawing Figures

APPARATUS FOR STRAIGHTENING CELL-FORMING PARTITIONS IN A CARTON

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to partitioned cartons and particularly to an apparatus for straightening misaligned partitions within a carton.

2. Description of the Prior Art

Many machines are known in the art for inserting partitions into cartons to divide the carton into product receiving cells prior to filling the carton with a product. Often, the partitions are inserted such that they are misaligned within the carton. Normally, these partitions must either be straightened by hand before a carton with misaligned partitions moves into a product filling station or removed from the line to the filling station. Otherwise, the product will strike the misaligned partitions and not go into its proper cell, and the product filler will shut down.

Our apparatus mechanically straightens the cell-forming partitions when they are misaligned.

SUMMARY OF THE INVENTION

The object of the present invention is to provide an efficient, reliable carton partition straightener for misaligned cell-forming partitions within a carton or case.

In accordance with the present invention an apparatus for straightening cell-forming partitions in a carton is provided by the combination of means for conveying cartons to and away from a partition straigthening station, means for stopping each carton at the partition straightening station, including means for supporting each carton therein, a mandrel disposed in the partition straigtening station adjacent and spaced from carton supporting means a distance sufficient to allow a carton between the mandrel and the carton supporting means, a plurality of cones disposed on the mandrel and projecting towards the carton supporting means, at least one of the cones being greater in length that the other of the cones, the cones having perimetric dimensions which are slightly smaller than those of the cells defined by partitions, and means for moving the mandrel towards and away from the carton supporting means.

In further accord with the present invention at least two of the cones are greater in length than the other of the cones, and the two longer cones are adapted to enter inner cells defined by partitions.

In accord with a further aspect of the present invention, either the carton supporting means or the mandrel is vibrated in a direction towards and away from the mandrel or carton supporting means, respectively, as the mandrel is moved towards the carton supporting means.

The foregoing and other objects, features and advantages of the present invention will become more apparent in light of the following detailed description of a preferred embodiment thereof, as illustrated in the accompanying drawings.

DESCRIPTION OF THE PREFERRED EMBODIMENT

Figure 1:
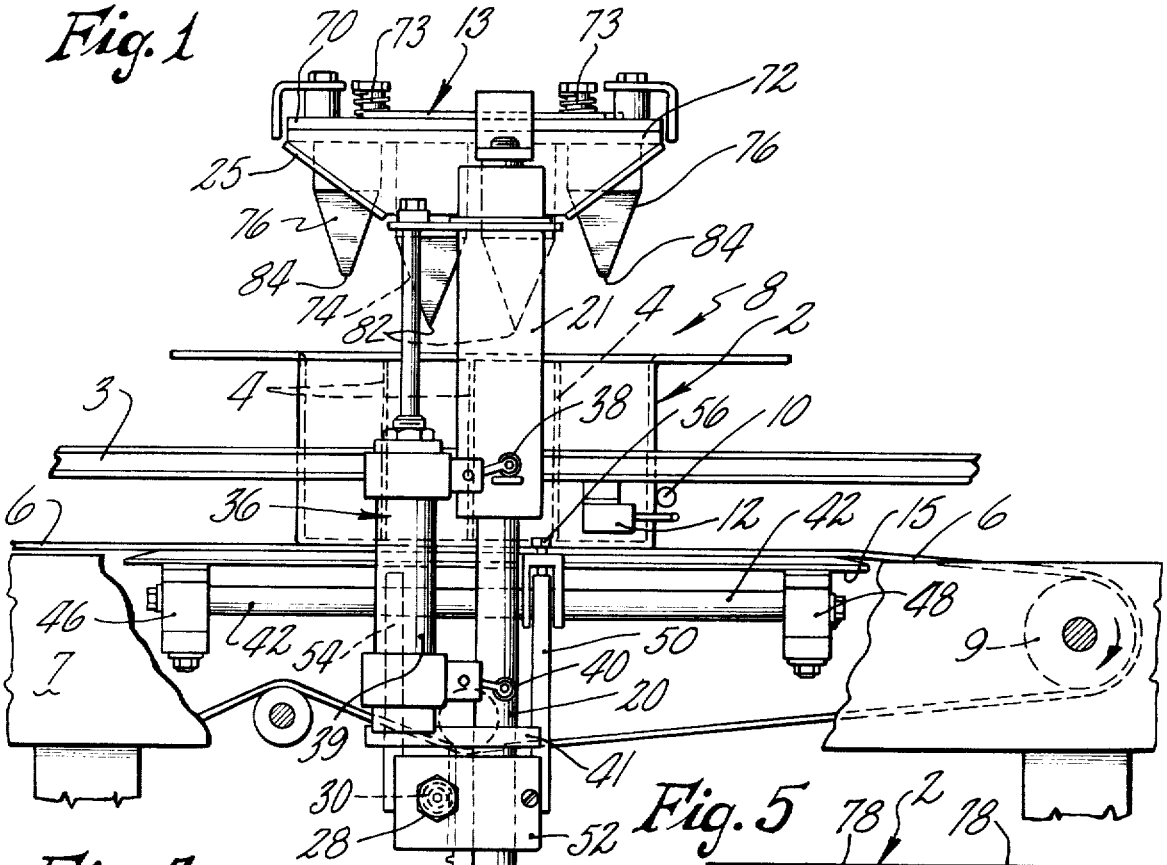
FIG. 1 is a partial side elevation view of an embodiment of a carton partition straightening apparatus according to the present invention.
Figure 2:
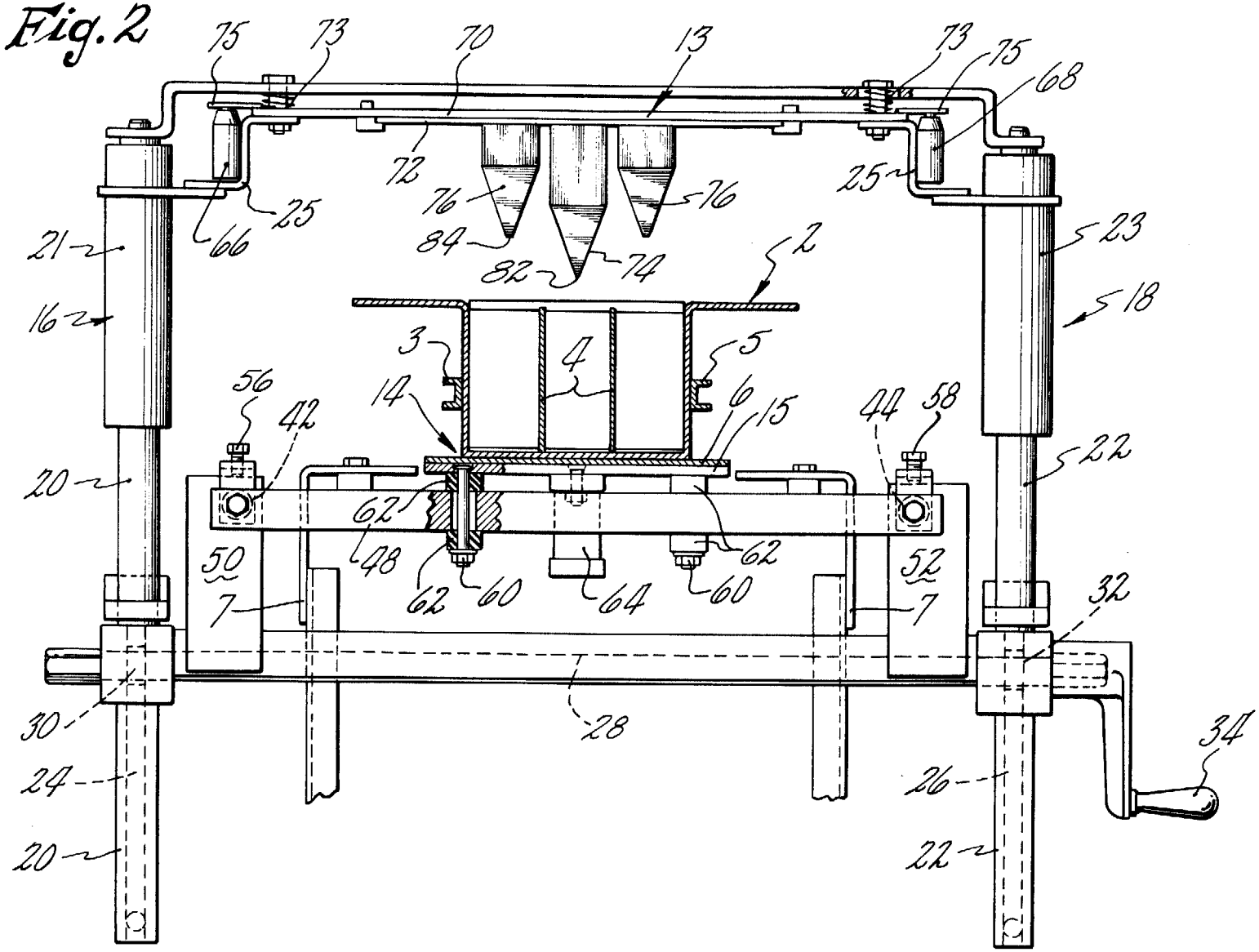
FIG. 2 is a front elevation view, partly in section, of the carton partition straightening apparatus of FIG. 1.

Referring now the the figures, wherein like numerals refer to like components, in FIGS. 1 and 2 there is shown one embodiment of an apparatus for straightening cell-forming partitions in a carton in accordance with the present invention.

A carton 2, having cell-forming partitions 4 therein proceeds on a conveyor 6 supported by a frame 7 in a carton packing line between side guide rails 3 and 5 to a partition straightening station, shown generally by the numeral 8. The conveyor 6 is driven by drive wheel 9, which may be driven by a motor in any conventional manner. A retractable carton stop 10 stops the carton 2 within the partition straightening station 8, and the carton 2 contacts a carton detecting switch 12. The carton 2 comes to rest in the partition straightening station 8 on a carton supporting means 14, which may be a plate 15 disposed immediately under the conveyor 6. A mandrel 13 is disposed in the partition straightening station adjacent and spaced from the carton supporting means 14 a distance sufficient to allow a carton 2 between the mandrel and the carton supporting means. The mandrel is guided during vertical movement by two vertical guide means 16 and 18. The guide means comprise shafts 20 and 22, respectively, having rack gears 24 and 26 disposed on their lower portions which are used for adjustment of the mandrel 13 as will be more fully explained hereinafter. Cooperating with the shafts 20 and 22, are sleeves 21 and 23, respectively. The sleeves are fixed to the frame 25 of the mandrel for movement therewith over the shafts 20 and 22. A pinion shaft 28 having pinion gears 30 and 32 disposed thereon in meshing relationship with rack ears 24, and 26, respectively is rotatably disposed on the frame 7. A hand crank 34 is provided at one end of the shaft 28. By turning the hand crank 28, the height of the mandrel 13 may be adjusted, either up or down. The mandrel 13 may be driven towards and away from the carton supporting plate 15 by a motor, such as an air motor 36 (shown in FIG. 1), or any of the other types of motors well known in the art. The motor 36 is disposed between the frame 25 of the mandrel 13 and the frame 7, the piston 37 of the air motor 36 being fixed to the mandrel frame 25, and the cylinder 39 of the air motor being fixed to a plate 41 which is disposed on the shaft 20 so that when the piston 37 is moved up or down, the mandrel will be moved up or down thereby. Preferably, there is a second air motor on the side of the partition straightening station 8 which is not shown, which is adapted to operate in the same manner as the air motor 36. A first switch 38 mounted on the air motor cylinder 39 is adapted to be contacted by the sleeve 21 when the mandrel 13 is in its uppermost position, and a second switch 40, also mounted on the air motor cylinders 39 is adapted to be contacted by the sleeve 21 when the mandrel 13 is in its lowermost position. Horizontal guide rods 42 and 44 are attached to the frame 7 via support members 46 and 48. Slidable locking members 50 and 52 are disposed around guide rods 42 and 44 respectively, and fixed to plates 52 which are attached to the frame 7. Second slidable members 54 are also disposed around the guide rods 42 and 44 and fixed to the plates 52. The mandrel is adjustable horizontally for centering above a carton by means of the slidable locking members 50 and 52 and slidable members 54. The members 50 and 52 may be locked in place by set screws 56 and 58 which bear against guide rods 42 and 44, respectively. The plate 15 may be isolatedly mounted to the support members 46 and 48 by bolts which have rubber bushings 62 disposed between the support members 46 and 48 and the plate 15 and between the support members 46 and 48 and the nuts which secure the bolts thereto. Means 64 for vibrating the plate 15 may be disposed on the lower side thereof. The vibrating means 64 may be any of the commercially available vibrators such as an air operated vibrator manufactured by the Branford Vibrator Co. of New Britain, Connecticut. The vibrating means is activated while the mandrel 13 is descending and vibrates the plate toward and away from the mandrel.

Two normally closed switches 66 and 68 may be disposed on the frame 25 of the mandrel. These switches are adapted to open, stop the mandrel from moving, and stop the conveyor 6 in the event that the mandrel meets excessive resistance while entering the carton 2, as might occur if the partition was totally misaligned, or a flap was closed, and the mandrel commenced to crush the carton 2 or the partitions 4. In that event, the mandrel would push against the upper plate 70, which would move relative to the plate 72 against the action of the springs 73, thereby lifting the contact 75 off the switch 66 or 68 and opening the circuit.

Figure 4:
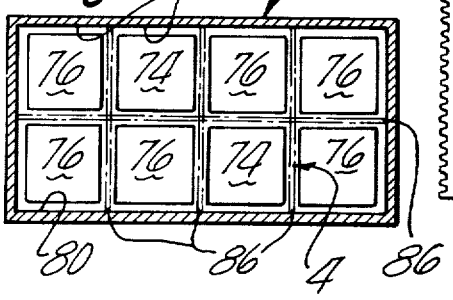
FIG. 4 is a plan view of a carton divided into eight cells by partitions, showing the disposition of the longer cones and the shorter cones during the partition straightening operation.
Figure 5:
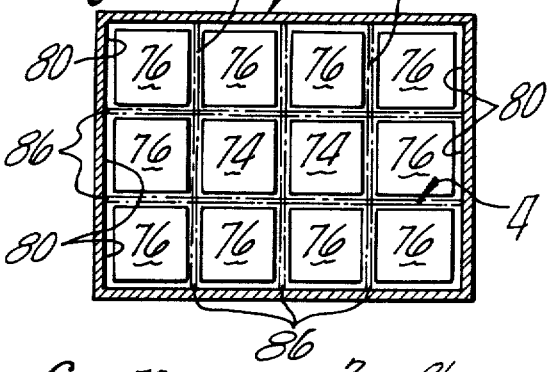
FIG. 5 is a plan view of a carton divided into 12 cells by partitions, showing the disposition of the longer cones and the shorter cones during the partition straightening operation.
Figure 3:
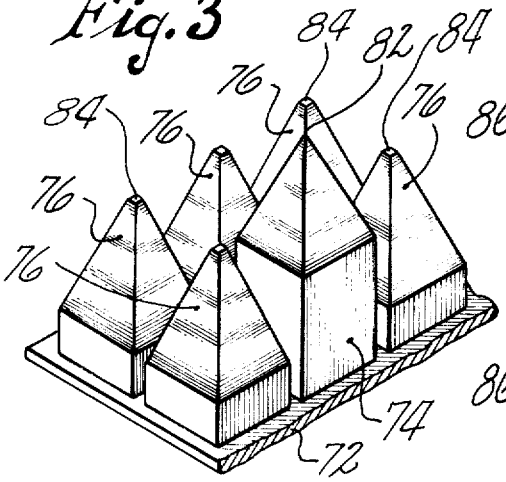
FIG. 3 is a partial view of one embodiment of a mandrel with straightening cones disposed thereon for use with the carton partition straightening apparatus of the present invention.
Figure 6:
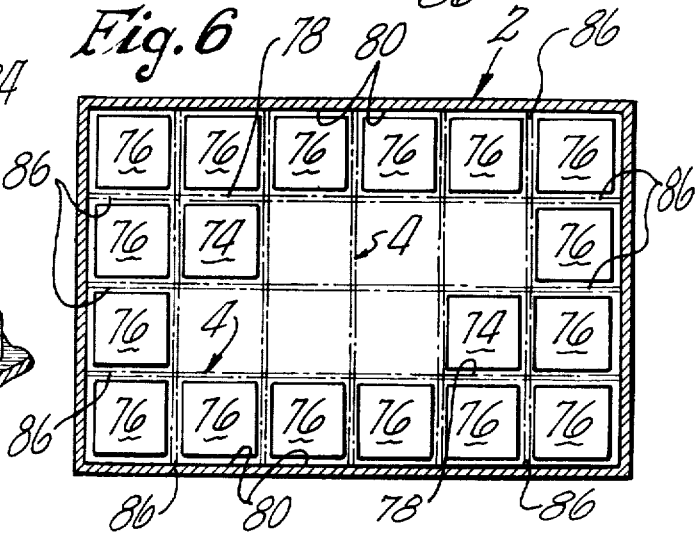
FIG. 6 is a plan view of a carton divided into 24 cells by partitions, showing the disposition of the longer cones and the shorter cones during the partition straightening operation.

FIG. 3 shows partition straightening cones which form a part of the present invention. The cones are disposed on the plate 72, which is operatively connected with the frame 25 for movement therewith. At least one cone 74 is longer than the other cones 76, which may be the same length. As will be obvious to those skilled in the art, the number of cones on the mandrel 13 will depend on the number and arrangement of the cells to be formed within the carton 2 by the partitions 4. We have found that preferably two of the cones 74 should be longer than the cones 76. FIGS. 4, 5 and 6 show, for example, three different carton/partition configurations in which the present invention may be utilized to advantage. FIG. 5 shows a 3 by 4 carton configuration in which the longer cones 74 enter inner cells 78 within the carton. The inner cells are those which are bounded by partitions on all four sides of the cell. In this configuration the mandrel will have shorter cones 76 to enter each of the outer cells 80. The outer cells are those which are bounded on only three sides by the partitions 4.

In FIG. 6, there is shown a 4 by 6 carton configuration in which the longer cones 74 enter inner cells 78 while the mandrel has shorter cones 76 to enter all the outer cells 80.

The purpose in having the longer cones 74 enter the inner cells 78 whenever the configuration permits is that normally, when partitions become misaligned within a carton, the inner cells 78 are generally not excessively out of place, even though the partition ends forming the outer cells 80 may be bent extremely out of place. The inner cells 78, being bounded on all four sides by partitions 4, may be out of square (i.e., they look like parallelograms) because of the partition misalignment, but they are nevertheless enterable by the longer cones 74. We have found that when the longer cones 74 have entered the inner cells 78, they square up all the other inner cells. The shorter cones 76 then enter each of the outer cells 80 and form them correctly by straightening the free ends 86 of the partitions 4.

FIG. 4 shows a carton/partition configuration in which there are no inner cells 78. In this case the longer cones 74 enter the cells shown, and the shorter cones 76 enter the remainder of the outer cells 80.

As will be obvious to those skilled in the art, the cones 74 and 76 have perimetric dimensions which are slightly smaller than the cells being formed. Preferably, the longer cones 74 have a pointed tip 82, while the shorter cones 76 have a square tip 84 to prevent piercing of the partition edge thereby.

There has thus been described a preferred embodiment of a carton partition straightening apparatus in accordance with the present invention. While a particular machine configuration has been shown, it will be understood by those skilled in the art that the benefits of our invention may be derived in many configurations and are not limited to the one shown in the preferred embodiment. Therefore, it should be understood by those skilled in the art that various changes and omissions in the form and detail thereof may be made therein without departing from the spirit and scope of the invention which is to be limited only as set forth in the following claims.

What we claim as new and desire to secure by Letters Patent of the United States is:

1. Apparatus for straightening cell-forming partitions in a carton, comprising:
   - means for conveying cartons to and away from a partition straightening station;
   - means for stopping each carton at said partition straightening station, including means for supporting each carton therein;
   - a mandrel disposed in said partition straightening station adjacent and spaced from said carton supporting means a distance sufficient to allow a carton between said mandrel and said carton supporting means;
   - a plurality of cones disposed on said mandrel and projecting towards said carton supporting means, at least one of said cones being greater in length than the other of said cones, said cones having perimetric dimensions which are slightly smaller than those of cells defined by the partitions; and
   - means for moving said mandrel towards and away from said carton supporting means.

2. Apparatus for straightening cell-forming partitions in a carton as defined in claim 1 wherein at least two cones are greater in length than said smaller of said cones, said at least two cones being operative to enter inner cells defined by partitions.

3. Apparatus for straightening cell-forming partitions in a carton as defined in claim 1, additionally comprising:

means for vibrating said carton supporting means in a direction towards and away from said mandrel as said mandrel is moved towards said carton supporting means.

4. Apparatus for straightening cell-forming partitions in a carton as defined in claim 2 wherein said other of said cones are operative to enter outermost cells defined by partitions.

5. Apparatus for straightening cell-forming partitions in a carton as defined in claim 4, additionally comprising means for vibrating said mandrel towards and away from said carton supporting means as said mandrel is moved towards said carton supporting means.

6. Apparatus for straightening cell-forming partitions in a carton as defined in claim 1, wherein said at least one of said cones being greater in length is adapted to enter an inner cell defined by partitions.

7. Apparatus for straightening cell-forming partitions in a carton as defined in claim 6, wherein said other cones are adapted to enter outermost cells defined by partitions.

*8. Apparatus for straightening cell-forming partitions in a carton, comprising:*

*means for conveying cartons to and away from a partition straightening station;*

*means for stopping each carton at said partition straightening station, including means for supporting each carton therein;*

*mandrel means movable toward and away from said carton supporting means in said partition straightening station, said mandrel means including inner and outer partition cell engageable elements having tapered lower ends projecting toward said carton supporting means for sequentially engaging first the inner partitions and only then the outer cell defining partitions of the carton as said mandrel means moves toward said carton supporting means.*

*9. Apparatus for straightening cell-forming partitions in a carton as defined in claim 8 wherein said inner partition cell engaging elements include corners for entering the inner cells and squaring the corners of the inner cells in addition to straightening the inner cell defining partitions as aforesaid, said corners of said inner cell engageable elements being spaced from one another by dimensions only slightly smaller than the corresponding dimensions of these inner cells.*

*10. Apparatus for straightening cell-forming partitions in a carton as defined in claim 9:*

*additionally comprising means for vibrating said carton supporting means as said mandrel means moves toward said carton supporting means.*

* * * * *

UNITED STATES PATENT AND TRADEMARK OFFICE

CERTIFICATE OF CORRECTION

PATENT NO. : Re. 30,508

DATED : February 10, 1981

INVENTOR(S): John L. Raudat

It is certified that error appears in the above-identified patent and that said Letters Patent are hereby corrected as shown below:

Col. 2, line 27, delete "the" (first occurrence).

Col. 2, line 58, "ears" should be --gears--.

Col. 5, line 1, "said smaller" should be --said other--.

Signed and Sealed this

*Twenty-sixth* Day of *May 1981*

[SEAL]

*Attest:*

RENE D. TEGTMEYER

*Attesting Officer* *Acting Commissioner of Patents and Trademarks*